United States Patent
Amundsen

(10) Patent No.: US 9,991,946 B2
(45) Date of Patent: Jun. 5, 2018

(54) METHOD AND DEVICE FOR MEASURING THE INTERFERENCE LEVEL OF VSAT TDMA TERMINALS CAUSING CROSS-POLAR AND/OR TERMINALS CAUSING CROSS-POLAR AND/OR COMMUNICATION LINK

(71) Applicant: Kratos Norway AS, Fornebu (NO)

(72) Inventor: Petter Chr. Amundsen, Fornebu (NO)

(73) Assignee: Kratos Norway AS, Fornebu (NO)

( * ) Notice: Subject to any disclaimer, the term of this patent is extended or adjusted under 35 U.S.C. 154(b) by 0 days. days.

(21) Appl. No.: 15/521,250

(22) PCT Filed: Oct. 24, 2015

(86) PCT No.: PCT/NO2015/050198
§ 371 (c)(1),
(2) Date: Apr. 21, 2017

(87) PCT Pub. No.: WO2016/064281
PCT Pub. Date: Apr. 28, 2016

(65) Prior Publication Data
US 2017/0353231 A1      Dec. 7, 2017

(30) Foreign Application Priority Data

Oct. 24, 2014   (NO) .................................. 20141270

(51) Int. Cl.
*H04B 7/185*      (2006.01)
*H04B 7/19*       (2006.01)
(Continued)

(52) U.S. Cl.
CPC ........... *H04B 7/18513* (2013.01); *H04B 7/10* (2013.01); *H04B 7/18589* (2013.01);
(Continued)

(58) Field of Classification Search
CPC ....................................................... H04B 17/18
(Continued)

(56) References Cited

U.S. PATENT DOCUMENTS 6,021,309 A  *  2/2000  Sherman ............ H04B 7/18534
                                                  455/12.1
6,463,279 B1 * 10/2002  Sherman ............ H04B 7/18539
                                                  455/12.1
(Continued)

FOREIGN PATENT DOCUMENTS

WO          9519078         7/1995
WO          02091599        11/2002
(Continued)

OTHER PUBLICATIONS

International Searching Authority, "Written Opinion," issued in connection with PCT Patent Application No. PCT/NO2015/050198, dated Jul. 11, 2016, 11 pages.
International Searching Authority, "International Search Report," issued in connection with PCT Patent Application No. PCT/NO2015/050198, dated Jul. 11, 2016, 6 pages.
(Continued)

*Primary Examiner* — Tilahun B Gesesse
(74) *Attorney, Agent, or Firm* — Hanley, Flight & Zimmerman, LLC

(57) ABSTRACT

It is described a device for measuring the interference level of VSAT TDMA terminals, the terminals (13) communicating with a hub station (14) via a satellite (11). The device includes a forward link receiver (21) adapted to receive signals transmitted from the hub station (14) to the terminals (13) via said satellite (11), said receiver being capable of demodulating, decoding and analyzing signalling information present in the forward link, including burst time plan, and terminal ID, a return link receiver (22) adapted to receive, demodulate and decode signals transmitted from each terminal (13) to the hub station (14) via said satellite (11) with extraction of the unique terminal network ID,
(Continued)

an interfered link receiver (23) adapted to measure received interfering burst power in a link where interference occurs, said receiver being configured and synchronized with the burst time plan found from the forward link or decoded bursts from the return link receiver, performing interfered burst power measurements using power averaging or correlation techniques, and a controller (24) adapted to control and synchronize the receivers, analyze and correlate information received from the receivers to achieve synchronization between the operational and interfered links (21, 22, 23) and report the power level of the interfering bursts for each terminal ID.

Methods for operating the device are also described.

4 Claims, 1 Drawing Sheet

(51) Int. Cl.
*H04B 17/345* (2015.01)
*H04B 7/10* (2017.01)
*H04B 17/18* (2015.01)
*H04W 24/02* (2009.01)

(52) U.S. Cl.
CPC ............ *H04B 17/18* (2015.01); *H04B 17/345* (2015.01); *H04W 24/02* (2013.01)

(58) Field of Classification Search
USPC ....................................... 455/13.2, 12.1, 13.1
See application file for complete search history.

(56) References Cited

U.S. PATENT DOCUMENTS

| | | | |
|---|---|---|---|
| 6,639,541 B1 * | 10/2003 | Quintana | G01S 19/21 342/18 |
| 2001/0034208 A1 | 10/2001 | Kline et al. | |
| 2002/0146995 A1 * | 10/2002 | McLain | H04B 7/18513 455/296 |
| 2003/0050015 A1 * | 3/2003 | Kelly | H04B 7/18519 455/67.14 |
| 2005/0085186 A1 | 4/2005 | Sandrin | |
| 2005/0117676 A1 | 6/2005 | Liu | |
| 2009/0086862 A1 | 4/2009 | Thesling et al. | |
| 2011/0206095 A1 * | 8/2011 | Beeler | H04B 7/18515 375/211 |
| 2017/0141906 A1 * | 5/2017 | Rainish | H04L 5/0073 |

FOREIGN PATENT DOCUMENTS

| | | | | |
|---|---|---|---|---|
| WO | WO 2002/091599 | * | 11/2002 | H04B 7/185 |
| WO | 2004057777 | | 7/2004 | |
| WO | WO 2004/057777 | * | 7/2004 | H04B 7/185 |

OTHER PUBLICATIONS

Norwegian Patent Office, "Norwegian Search Report," issued in connection with Norwegian Patent Application No. 20141270, dated May 22, 2015, 3 pages.

International Telecommunication Union, "Recommendation ITU-R SM.1600-1—Technical identification of digital signals," Sep. 2012, 32 pages.

International Telecommunication Union, "ITU Handbook on Spectrum Monitoring," (Edition 2011) [http://www.itu.int/dms_pub/itu-r/opb/hdb/R-HDB-23/2011-PDF-E.pdf], 678 pages.

* cited by examiner

METHOD AND DEVICE FOR MEASURING THE INTERFERENCE LEVEL OF VSAT TDMA TERMINALS CAUSING CROSS-POLAR AND/OR TERMINALS CAUSING CROSS-POLAR AND/OR COMMUNICATION LINK

This patent is a US national stage application of International Patent Application No. PCT/NO2015/050198 which was filed on Oct. 24, 2015 under the Patent Cooperation Treaty (PCT), which claims priority to Norwegian Patent Application No. 20141270 which were filed on Oct. 24, 2014, all are hereby incorporated herein by reference in their entireties.

FIELD OF THE INVENTION

The present invention relates to a device and method for identifying interference sources by their terminal ID as well as the level of interference caused in multiple access communication systems. It addresses specifically interference caused by TDMA satellite communication terminals in the geo-stationary orbits, but the invention may also be applied to other scenarios, such as other shared access technologies where the terminals are dynamically assigned to return link resources.

BACKGROUND

Satellites placed in the geostationary orbit appear stationary seen from earth. This enables communication between earth stations (in the following referred to as terminals or VSAT terminals) using highly directive, fixed antennas that are pointed to the geostationary orbit of the satellite of interest. The transmitting terminal sends a polarized high radio frequency signal (RF) to the satellite, where the signal is received, shifted in frequency, amplified and retransmitted on the opposite polarization to the receiving terminal.

The polarization in the satellite is normally opposite for transmission and reception. The polarization schemes are either circular (left-hand and right-hand) or linear (vertical or horizontal). E.g. one system can communicate by transmitting vertical polarization and receiving horizontal polarization while a different system may use opposite polarizations for the same frequencies.

Due to the high directional gain of the satellite dish, as well as the discrimination achieved by the polarization, the same frequency band can be re-used without any further frequency planning considerations:
  In the same satellite, the opposite polarization can be re-used
  Neighbour satellites at sufficient spacing in the geostationary orbit (this depends on the frequency band) can re-use the same frequency band on both polarizations A fundamental assumption for the uncoordinated frequency re-use described above is that terminals comply with agreed levels of unwanted transmission that may cause interference:
  Crosspolar Interference—unwanted transmission on opposite polarization.
  Adjacent Satellite interference—unwanted transmission towards neighbour satellites
  In the following, both cross polar and adjacent satellite inference is referred to as interference, and the term interfered link refers to both cross-polar and adjacent satellite links or spectrum where interference occurs.

Interference levels are managed by the satellite segment operators by only allowing antennas with accepted properties with respect to:
  Transmission level on opposite polarization when the antenna is correctly aligned
  Transmission level (gain) as a function of the offset angle (angle between the measured direction and the antenna main pointing direction), ensuring low transmission to neighbour satellites when the antenna is correctly aligned
  Approved alignment procedures
  It is essential that the antenna is properly aligned. The alignment is normally monitored by the satellite operator NCC (Network Control Centre) when the terminal is taken into use ("commissioning"), ensuring that the terminal antenna is installed correctly and that the transmission is as planned:
  Correct power level
  Correct pointing
  Acceptable crosspolar interference level
  The interfering power level to the neighbour satellites is not normally measured as the procedure and antenna properties shall ensure that the radiation outside the main beam is below specified levels Occasionally the terminal antenna may come out of alignment, e.g. if it has been displaced by strong winds. A misaligned antenna may cause interference:
  Adjacent satellite interference
  The satellite in the neighbouring orbital position receives an increased level of the transmitted signal as interference, disturbing services
  Crosspolar interference
  The misalignment causes increased transmission level of the opposite polarization, disturbing services in the crosspolar segment Such interferences are generally a violation of the agreed operational terms for using the space segment. In some cases the terminal should be re-aligned as soon as possible within a reasonable time window, while in other cases the terminal should be taken out of service at once until the antenna has been re-aligned. In other cases equipment failures cause interference to occur. However, it is not straightforward to identify the terminal causing the interference with currently available technology.

For terminals transmitting a continuous signal, there is a single source for the cause and the terminal causing significant and disturbing interference can normally be identified by the carrier frequency itself.

In the case of satellite communication systems with many terminals sharing the same satellite resources, such as in VSAT networks (VSAT=Very Small Aperture Terminals), finding the terminal causing interference is more complicated. In VSAT networks, the same frequency resources are shared in time division mode, TDMA. In these networks, the terminal requests capacity and the network master (hub station) dynamically allocates time slots (DAMA—Demand Assignment Multiple Access) to the terminals. Each time slot is assigned to one terminal only by signalling messages broadcast on the forward link (hub to terminal). Each terminal in the network has a unique ID that the VSAT network operator assigns. The unique terminal ID may be 1) extracted from the burst transmitted to the hub on the return link (terminal to hub) by demodulating and decoding the burst or 2) by analysing information broadcasted from the hub to the terminals, e.g. signalling of assignment of time slots to each terminal.

The interference will only occur in the time slots assigned to the interfering terminal. However, synchronising the information found in the burst time plan with bursts detected in the TDMA channel remains a problem with current solutions.

The satellite owner monitors the satellite space segment continuously from a control centre operated 24 hours a day. Detecting the occurrence of interference is currently done using power density spectrum monitoring systems. The limitation of this approach is that it can only detect the interference level when it exceeds the allowed interference level. Also, the interference may not be possible to observe if other services are in operation in the same frequency segment.

VSAT terminal interference is especially complicated and time-consuming to resolve as there is currently no tool available to identify the source of interference with certainty.

Also, there is currently no general solution which allows measurement of the interference level at installation and commissioning time, or which allows the normal interference level to be measured under normal operational conditions.

To identify terminals causing interference, the normal procedure is to close down or move the possible terminals (or groups of terminals) one-by-one until the culprit is found. However, such a procedure is generally very difficult to perform for commercial reasons as it disturbs the network operations.

If the interference is large, it may be possible to demodulate and decode the information of the interfered burst in a direct manner. This approach is covered by basic TDMA link reception and existing well-known technologies and is outside the scope for this invention.

From US 2005/0085186 A1 there is known a method of detecting if terminals are causing interference between adjacent satellites. The terminals are sending on separate carrier frequencies, according to a fixed plan. A station is detecting the power spectrum of signals received from an adjacent satellite to uncover possible interference. The frequency of an interfering carrier is used to identify the interfering terminal.

SUMMARY OF THE INVENTION

It is an object of the present invention to overcome the above-mentioned limitations and provide a device and method for monitoring and determining the source and level of TDMA interference. By determining the interfering terminal ID, the hub operator can take action and quickly and easily resolve the interference.

This invention applies to interference where the signal-to-noise ratio is too low to allow direct decoding of the burst payload in the interfered link, as this approach is basic technology outside the scope of this invention.

Determining the interfering terminal ID for interference where the SNR is too low to allow direct decoding of the burst contents is achieved in a device and methods as claimed in the appended claims.

According to a first aspect, the invention relates to a method for identifying the terminal ID, and measuring the interference level of VSAT TDMA terminals causing cross-polar and/or adjacent satellite interference in a communication link, the terminals communicating with a hub station via a first satellite. The method includes the steps of:

a) monitoring a frequency spectrum in said first satellite or an adjacent satellite to detect if any terminals communicating with the hub station via the satellite are causing cross-polar or adjacent satellite interference, b) determining signal power level and arrival times of interfering bursts for each terminal in the monitored frequency spectrum in said first satellite or the adjacent satellite, c) determining the ID of each terminal that is transmitting bursts causing interference, said ID being used by the hub to identify the terminal in the communication protocol, by either receiving a burst time plan from the hub station, synchronising the burst time plan with the actual transmission in the VSAT network and applying the information in burst time plan with the arrival times and frequencies of the interfering bursts, or demodulating and decoding the content of the TDMA signals transmitted from the terminals to the hub station thereby deriving the terminal ID present as information in the burst, and synchronising the derived burst time plan with the bursts on the interfered link.

According to a second aspect, the invention relates to a method for measuring the interference level of VSAT TDMA terminals causing cross-polar and/or adjacent satellite interference in a communication link, the terminals communicating with a hub station via a first satellite. The method includes the steps of:

receiving a burst time plan from the hub station or establishing a burst time plan by receiving and decoding signals transmitted from the terminals to the hub station, selecting a particular terminal occurring in the burst time plan, receiving signals transmitted from said selected terminal to the hub station, receiving signals in said communication link, correlating the waveform of the signals transmitted from said selected terminal to the hub station with the waveform of signals received in said communication link to detect any interference that may be present in the communication link.

An important aspect is that the invention allows measurement and determination of the interference source by terminal ID also in cases where the interference has so low power that it is impossible to demodulate the information in the interference, it is the combination of applying the demodulation and decoding of operational link together with the correlation and burst power measurements in the interfered link that differentiates the invention from existing patents.

This method may be repeated for another terminal, until all terminals have been monitored.

According to a third aspect, the methods according to the first aspect may be expanded by, for adjacent satellite interference, including the additional steps of determining differences in arrival time and frequency offset of identical signals received via said satellites where the terminal ID and burst time plan information is used to assist the determination of the physical location of a station transmitting said signals.

This method allows the position of a TDMA VSAT terminal to be determined and identified with the terminal ID also for cases where many TDMA terminals operate in the same frequency. Existing geolocation solutions and patents are based on using measured time and frequency differences to differentiate between terminals as a mechanism to distinguish the terminals from each other without performing decoding of the payload information. As the number of terminals operating on the same frequency becomes large, this approach does not work. Decoding the burst content and thereby with certainty determining the source of each burst, allows the necessary correlations to be performed for all applicable bursts from one terminal at a time, thereby allowing the geolocation algorithm to work also in cases with many terminals present on the same frequency.

The proposed technology is directly applicable for this application.

According to a fourth aspect, the invention relates to a device for measuring the interference level of VSAT TDMA terminals, the terminals communicating with a hub station via a satellite. The device includes a forward link receiver adapted to receive signals transmitted from the hub station to the terminals via said satellite, said receiver being capable of demodulating, decoding and analysing signalling information present in the forward link, including burst time plan, and terminal ID, a return link receiver adapted to receive, demodulate and decode signals transmitted from each terminal to the hub station via said satellite with extraction of the unique terminal network ID, an interfered link receiver adapted to measure received interfering burst power in a link where interference occurs, said receiver being configured and synchronized with the burst time plan found from the forward link or decoded bursts from the return link receiver, performing interfered burst power measurements using power averaging or correlation techniques, and a controller adapted to control and synchronize the receivers, analyse and correlate information received from the receivers to achieve synchronisation between the operational and interfered links and report the power level of the interfering bursts for each terminal ID.

Said terminal ID may be a MAC address or other unique number or string identifying the terminal in the communication with the hub.

Benefits of this device is that it operates completely independent of the VSAT hub station, it identifies terminals causing interference with certainty using the internal communication network ID, it operates without disturbing the normal operation of the network in any way, it can detect low interference levels where the SNR does not allow demodulation of the burst contents in the interfered signal.

BRIEF DESCRIPTION OF THE DRAWINGS

In the following sections, the invention will be described in detail in reference to the appended drawings, in which.

DETAILED DESCRIPTION

Figure 1:
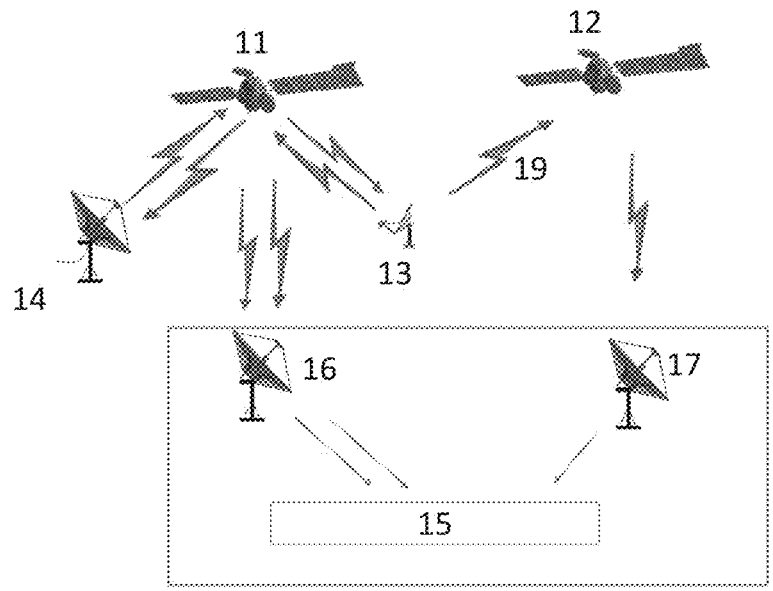
FIG. 1 is a block diagram of a satellite system in which a terminal is interfering an adjacent satellite.

In FIG. 1 there is shown two geo-stationary satellites, the first satellite 11 and the second satellite 12. A number of terminals are communicating with a hub station 14 through the first satellite 11. Here, only one terminal 13 is shown.

If the antenna of the terminal 13 is misaligned, a part of its transmitted signal may cause cross-polar interference, as well as being received by the adjacent satellite 12 and appear as interference in the corresponding frequency segment of this satellite. It is in the following assumed that the interference is not powerful enough to allow a direct demodulation and decoding of the interfering burst which then would reveal the terminal ID directly. This approach is covered by well-known technology.

In order to detect the interference and identify the source (the terminal causing the interference), an interference guarding (i.e. measuring) device 15 is introduced in the system. The device 15 is connected to a first antenna 16 receiving the signals from the operational satellite 11, and a second antenna 17 receiving signals from the adjacent satellite 12.

Figure 2:
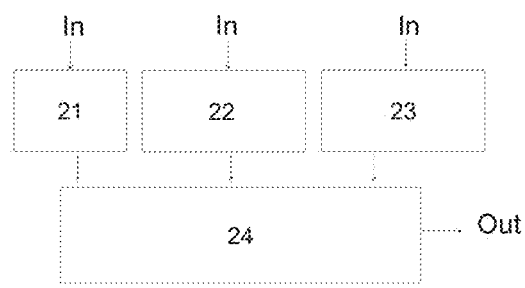
FIG. 2 is a block diagram of the inventive device.

FIG. 2 is a block diagram showing the internal components of the interference guarding device 15. The interference guarding device includes a first receiver 21 for receiving signals sent to the hub station, a second receiver 22 for receiving signals sent to the terminal and a third receiver 23 for receiving the downlink signal from the adjacent satellite. The receivers are controlled by a Controller 24, which is adapted to output a list of interfering terminals and their interference levels.

The interference guarding device may survey interference from VSAT terminals using either a power density measurements or waveform correlation.

By applying power density measurements, the interference guarding device will synchronise the interfered signal with the operational signal, average the received power for each burst output the result as interference power level. The ID of the terminal that is causing interference is determined by either correlating the detected interference bursts with the same bursts received and decoded from the satellite while extracting the terminal ID from this burst, or by determining the arrival time and frequency of the interference bursts and correlate with signalling information received on the first receiver 21.

By applying correlation, the bursts of a particular terminal are received (by the second receiver 22) and the waveform is then cross-correlated with the interfered signal to detect the level of correlation, determining the level of interference. A key technology element in this invention is to use correlation techniques to find the interfering signal by correlating the known waveform found in the first satellite with the channel where the interference occurs. The waveform in the correlation procedure may be a sequence of known symbols, unique word, preamble or other known symbols distributed in the burst payload. It may also be a partial or full remodulated waveform sequence after having determined the sequence of the same burst from the first satellite. In particular, the term waveform is here meant to cover a known symbol pattern or modulation sequence, e.g. preamble, unique word or remodulated burst sequence after demodulation in an operational satellite.

With this method, it is possible to detect interfering signals that are buried in noise, and thus detect the interference level under normal operating conditions, as well as in an early stage of development before operational problems due to the interference are occurring.

The inventive device may also be used for determining its position by determining differences in arrival time and frequency offset of identical signals received via the first and second satellites. Said identical signals are the signals on the return link and the corresponding interference signals. Geo-location techniques are well known from satellite systems using continuous carriers and also for TDMA carriers where the number of terminals sharing a frequency is limited to a small number. For larger numbers of terminals sharing the same frequency, this invention will allow geolocation to be performed as the terminal ID of every burst is known before frequency and timing correlation is performed.

DEFINITIONS

VSAT TDMA network Satellite terminals (13) communicating with a hub station (14) via a satellite (11), Interference Crosspolar or adjacent satellite interference
Interfered link Link or satellite spectrum where crosspolar or adjacent satellite interference occurs
Interfered signal Link or satellite spectrum where crosspolar or adjacent satellite interference occurs

The invention claimed is:

1. A method for identifying the terminal ID and measuring the interference level of VSAT TDMA terminals causing interference with low signal-to-noise ratio in a first or second communication link, the terminals (13) communicating with a hub station (14) via a first satellite (11), the second satellite (12) communicating on a second communication link, wherein an interference guarding device (15) may receive signals on said first and second communication links, the interference guarding device (15) performing the steps of:
   a) monitoring a frequency spectrum in signals received from said first satellite (11) on said first communication link or from the second satellite (12) on said second communication link, determining from said monitored frequency spectrum if any terminals (13) communicating with the hub station (14) via the satellite (11) on the first communication are causing cross-polar interference in the first communication link or interference in the second communication link,
   b) determining signal power level and arrival times of interfering bursts for each terminal in said monitored frequency,
   c) determining the ID of the terminal that is transmitting bursts causing interference, by either
      receiving a burst time plan from the hub station on the first communication link, synchronising the burst time plan with the actual transmission on the first or second communication link in order to identify the interfering terminal, and reading the ID of the interfering terminal from the burst time plan, or
      demodulating and decoding the content of the TDMA signals transmitted from the terminals to the hub station on the first communication link to derive a burst time, synchronising the derived burst time plan with the bursts on the first or second communication link in order to identify the interfering terminal, and reading the ID of the interfering terminal from the bursts.

2. A method according to claim 1, for adjacent satellite interference, including the additional steps of determining differences in arrival time and frequency offset of identical signals received via said satellites where the terminal ID and burst time plan information is used to assist the determination of the physical location of a station transmitting said signals.

3. An interface guarding device for measuring the interference level of VSAT TDMA terminals, the terminals (13) communicating with a hub station (14) via a first satellite (11) on a first communication link, wherein a second satellite (12) may be adjacent to the first satellite (11), the second satellite (12) communicating on a second communication link, characterized in that the device includes a forward link receiver (21) adapted to receive signals transmitted from the hub station (14) to the terminals (13) via said satellite (11) on said first communication link, said receiver being capable
   of demodulating, decoding and analysing signalling information present in the forward link, including burst time plan, and terminal ID, a return link receiver (22) adapted to receive, demodulate and decode signals transmitted from each terminal (13) to the hub station (14) via said satellite (11)
   with extraction of the unique terminal network ID, on said first communication link, with extraction of the unique terminal network ID,
   an interfered link receiver (23) adapted to measure received interfering burst power in the first or second link where interference occurs, said receiver being configured and synchronized with the burst time plan found from the forward link or decoded bursts from the return link receiver, performing interfered burst power measurements using power averaging or correlation techniques, and
   a controller (24) adapted to control and synchronize the receivers, analyse and correlate information received from the receivers to achieve synchronisation between the operational and interfered links and report the power level of the interfering bursts for each terminal ID.

4. A device according to claim 3, wherein said terminal ID is a MAC address or other unique number or string identifying the terminal in the communication with the hub.

* * * * *